April 21, 1970   R. H. LARSON   3,507,301
COLLECTOR AND METHOD OF MAKING THE SAME
Filed April 21, 1966   3 Sheets-Sheet 1

INVENTOR.
ROBERT H. LARSON
BY
WILSON, SETTLE, BATCHELDER
ATT'YS. & CRAIG

INVENTOR.
ROBERT H. LARSON
BY
WILSON, SETTLE, BATCHELDER
ATT'YS. & CRAIG

April 21, 1970 R. H. LARSON 3,507,301
COLLECTOR AND METHOD OF MAKING THE SAME
Filed April 21, 1966 3 Sheets-Sheet 3
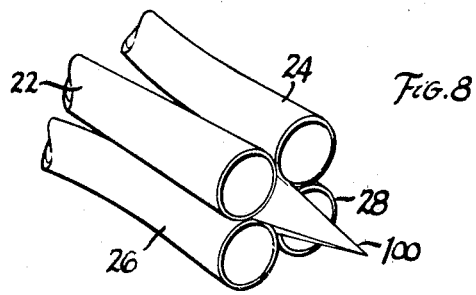
FIG. 8
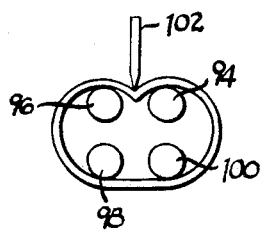
FIG. 7
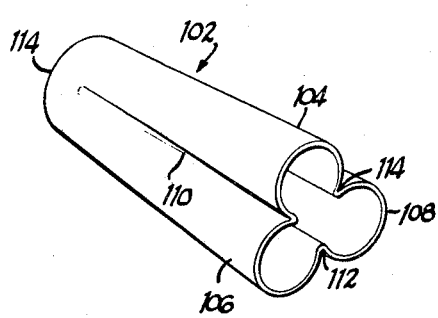
FIG. 9
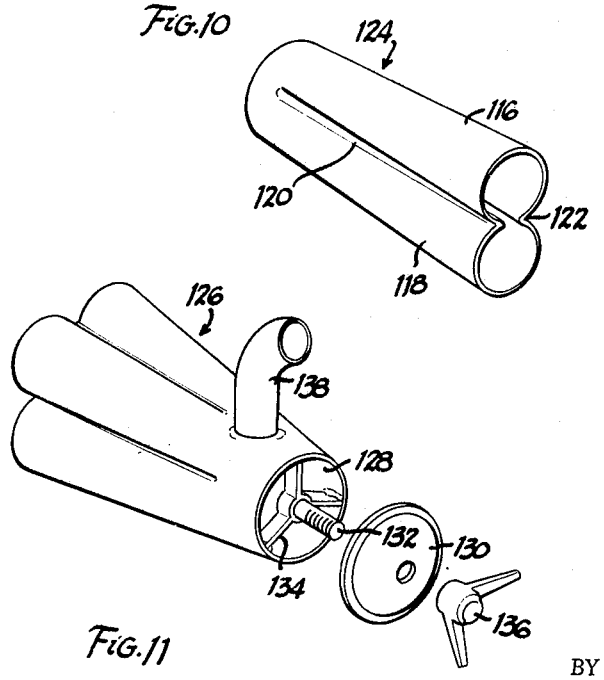
FIG. 10
FIG. 11
INVENTOR.
ROBERT H. LARSON
BY
WILSON, SETTLE, BATCHELDER
ATTYS. & CRAIG

United States Patent Office 3,507,301
Patented Apr. 21, 1970

3,507,301
COLLECTOR AND METHOD OF MAKING THE SAME
Robert H. Larson, 153 Nash, Dearborn, Mich. 48124
Filed Apr. 21, 1966, Ser. No. 544,298
Int. Cl. F01n 7/08
U.S. Cl. 137—602                                      4 Claims

ABSTRACT OF THE DISCLOSURE

An exhaust collector which is a metal tube having semitubular lobes extending from one end thereof over at least half of the length of the tube, with the tube having a single tube portion at the other end thereof. The lobes merge gradually into the single tube portion to provide smooth flow of exhaust gases through the collector.

Background of the invention

This invention relates generally to exhaust systems for internal combustion engines, and more particularly to an exhaust collector to be jointed to individual header pipes and providing a smooth transition from the individual header pipes to a single collector tube portion at the outlet end of the collector so as to provide a smooth flow of exhaust gases through the collector. The invention also includes the method of making the collector.

The building of racing cars and hot rods has become very popular in recent years, and the market for specialized parts and equipment for such cars has grown substantially. One such specialized item is the exhaust system. In a typical exhaust system a plurality of tubes or pipes lead from the engine exhaust outlets to a single tube called a collector where the gas streams from the individual pipes are combined. The plural pipes and single collector are collectively referred to as a header. A major difficulty with known headers and particularly the collectors thereof is that a completely smooth flow of gas through the tubes is not obtained, there being obstructions, irregularities or openings in the flow path which cause turbulence as gas flows through the individual header pipes and through the collector. Such turbulence creates excessive back pressure which is to be avoided if possible.

Summary of the invention

The present invention provides a collector, and a combination of header pipes with the collector, through which exhaust gases flow smoothly with little or no turbulence. The collector is a tube, preferably a one-piece metal tube, which has a rounded portion at one end thereof and a plurlaity of semitubular lobes extending from the other end thereof over at least half of the length of the collector tube. The semitubular lobes are defined by creases in the collector tube which also extend over at least half of the length of the tube, and the lobes and creases gradually merge into the rounded portion of the tube. There is a smooth gradual transition from plural semitubular lobes to a single rounded tube portion over the length of the collector tube which assures smooth flow of gases through the collector tube. The collector may have two, three or four lobes depending on the number of header pipes to which it is to be joined. The lobed end of the collector matches the configuration of the header pipes so that the joint between them has no obstructions to cause turbulence. The opening located centrally of a cluster of three or four header pipes is blocked, preferably by a pyramidal member which extends into the lobed end of the collector to promote a smooth transition from header pipes to collector tube.

The method of making the collector is carried out by rolling a piece of flat sheet metal into a generally conical tube, fusing the seam of the tube and creasing the tube from the larger end thereof over at least half of its length to provide semitubular lobes extending over at least half of the length of the tube. The creasing may be accomplished by simply pressing a blade against the tube while supporting it inwardly with an arbor. The tube could be formed in one step as by a swedging operation, and the creases might all be formed at the same time if desired.

Accordingly, it is an object of the present invention to provide an exhaust collector which affords a smooth transition from multiple header pipes at the input to the collector to a single tube at the output of the collector.

Another object of the invention is to provide a collector characterized by smooth flow of exhaust gases through the collector.

A further object of the invention is to provide a collector with semitubular lobes at one end thereof for connection to header pipes, the lobes extending over at least half of the length of the collector and merging into a rounded tube portion at the other end of the collector.

Another object of the invention is to provide a collector with longitudinal creases which define semitubular lobes, the creases and the lobes extending over at least half of the length of the collector to provide a gradual transition from multiple lobes to a single rounded tube portion, thereby assuring smooth flow of gases through the collector.

Another object of the invention is to provide a method of making collectors wherein semitubular lobes are formed by longitudinally creasing a collector tube at places spaced about the tube's circumference.

Other objects of this invention will appear in the following description and appended claims, reference being had to the accompanying drawings forming a part of this specification wherein like reference characters designate corresponding parts in the several views.

On the drawings:

FIGURE 7 is an end view illustrating a step of creasing the collector tube;

FIGURE 8 is a fragmentary perspective view of a group of header pipes having a pyramidal member closing a central opening between the pipes;

FIGURE 9 is a perspective view of a three-lobe collector;

FIGURE 10 is a perspective view of a two-lobe collector; and

FIGURE 11 is a perspective view of a four-lobe collector provided with an end cap and a tube branching off the side of the collector.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
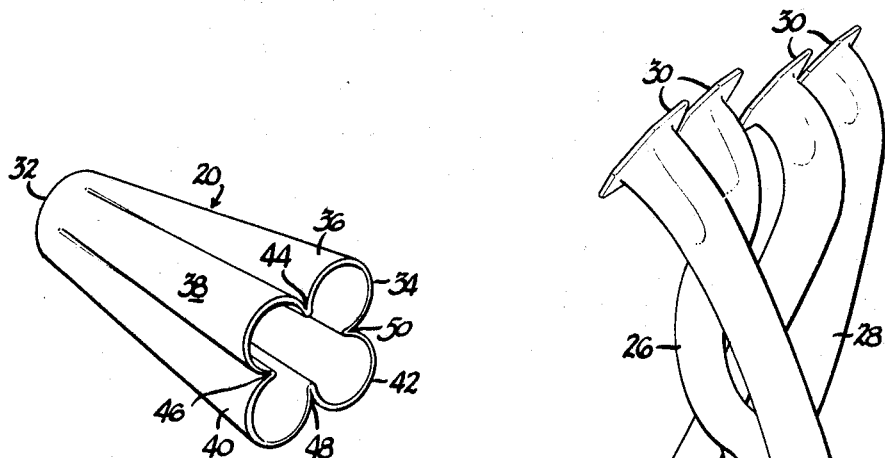
FIGURE 1 is a perspective view of a collector according to one embodiment of the invention joined to four header pipes.

As shown on the drawings:

The header shown in FIGURE 1 includes a collector 20 joined to four header pipes 22, 24, 26 and 28. The header pipes are attached to the exhaust ports of an engine by means of flanges 30 and suitable fasteners. Exhaust gases flow through the header pipes to the collector 20 where the individual gas streams are combined and flow from the outlet end 32 of the collector 20 as a single stream. The header pipes are joined to the inlet end 34 of the collector, and the collector provides a smooth and gradual transition from the individual pipes at the inlet end of the collector to a single rounded tube at the outlet end 32 of the collector. The four pipes 22, 24, 26 and 28 are all of the same length so as to provide the same back pressure in each pipe. The collector 20 provides a smooth flow of exhaust gases from the inlet end to the outlet end of the collector without any obstructions or openings which could build up back pressure.

Figure 2:
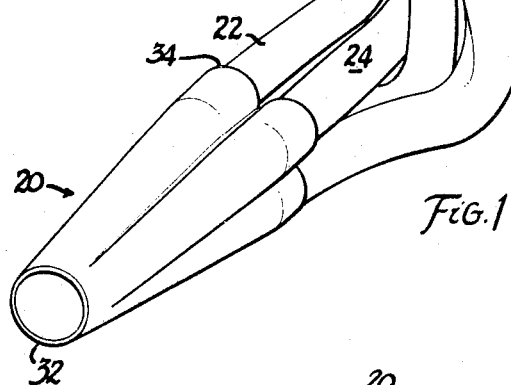
FIGURE 2 is a perspective view of the collector of FIGURE 1.

As shown in FIGURE 2, the inlet end 34 of the collector has a clover-leaf configuration. It may be seen that at the inlet end 34 there are four semitubular lobes, 36, 38, 40 and 42. These lobes extend over the full length of the collector tube 20 and they taper inward and gradually merge into the rounded outlet end 32 of the collector tube. The lobes are defined by creases 44, 46, 48 and 50 which also extend nearly the full length of the collector tube 20 and which merge into the rounded outlet end 32 of the collector tube. There is a crease on each side of each of the lobes, and there are four such creases for a four lobe collector as shown in FIGURE 2. In order to assure that exhaust gases will flow smoothly through the collector, there should be a gradual transition from semitubular lobes at end 34 to the rounded tube portion at end 32. Where the creases and semitubular lobes extend for nearly the full length of the collector tube 20 and merge gradually into the rounded end, the gradual transition is assured. The creases and semitubular lobes should extend over at least half of the length of the tube in order to provide the desired gradual transition from semitubular lobes to rounded end portion. The creases and lobes can extend the full length of the collector. The rounded end need not be circular; an oval or other annular configuration would also be satisfactory. The annular end can have one or more flat sides if desired.

Figure 3:
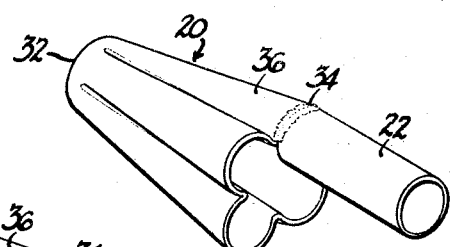
FIGURE 3 shows a single pipe butt welded to one of the lobes of a four-lobe collector.
Figure 4:
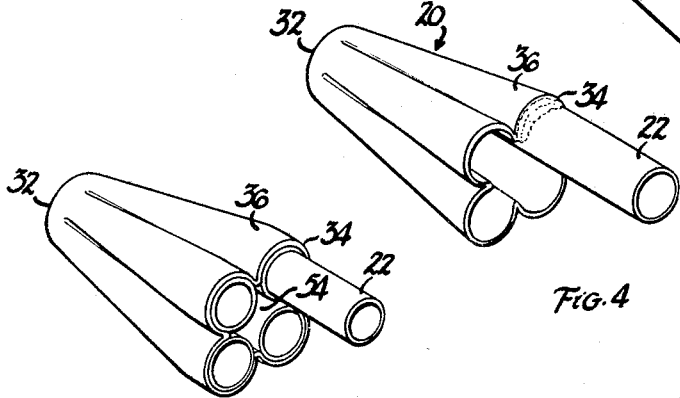
FIGURE 4 shows a pipe lap welded to one lobe of a collector.
Figure 5:
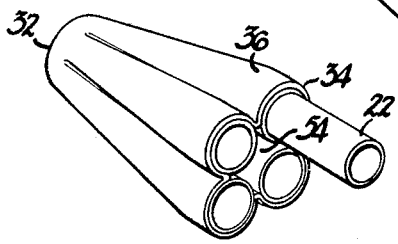
FIGURE 5 shows a quick-disconnect type of connection between a pipe and a collector.

The clover-leaf end 34 of the collector 20 is joined to the individual header pipes 22, 24, 26 and 28. FIGURES 3, 4 and 5 show three different suitable types of joints which may be provided between the collector and the header pipes. In FIGURE 3, the pipe 22 has the same diameter as the semitubular lobe 36 at the inlet end 34 of the collector. The pipe 22 is fused to lobe 36 as by welding of the joint between end 34 and the end of the pipe 22. This assures a smooth transition from the pipe 22 to the collector 20. In FIGURE 4, the pipe 22 is slightly smaller in diameter than the semitubular lobe 36 so that the end of the pipe 22 slips inside the lobe 36. Again, the pipe 22 and the lobe 36 are welded together to form a lap welded joint between them. In FIGURE 5, a cluster of rings 54 fits inside the clover-leaf end 34 of the collector and is welded to the collector. The pipe 22 fits slidably into one of the rings inside the semitubular lobe 36. As a result of the loose fit of the tube 22 in the corresponding one of the rings 54, the pipe may be removed from the collector 20 by merely pulling it out of the collector. This type of connection between the pipes and the collector is called a quick-disconnect connection.

Figure 6A:
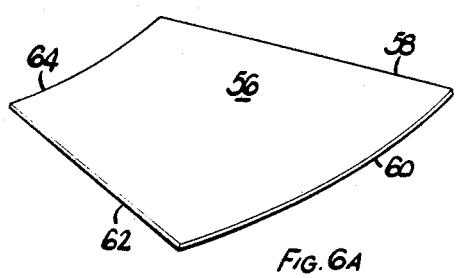
FIGURES 6A through 6G are a series of views illustrating a method of making a collector tube.
Figure 6B:
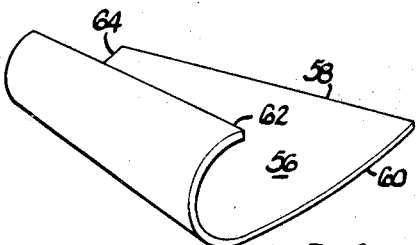
Figure 6C:
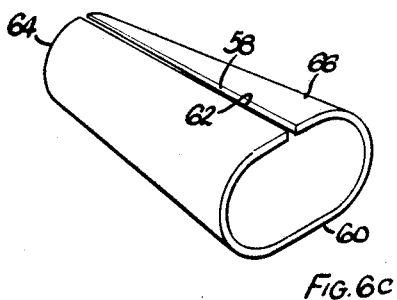
Figure 6D:
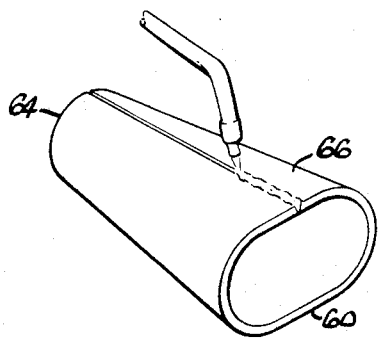
Figure 6E:
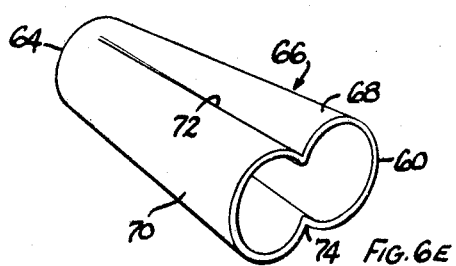
Figure 6F:
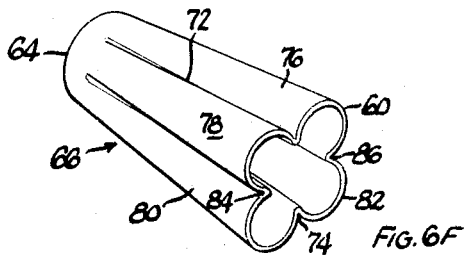
Figure 6G:
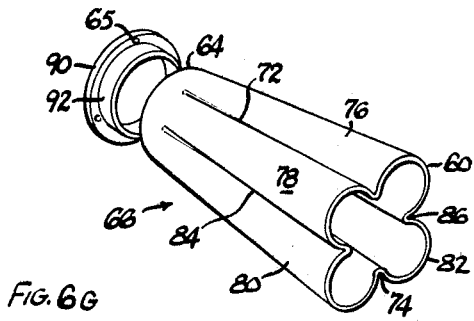

FIGURES 6A through 6G inclusive illustrate a collector at different stages of its fabrication. In FIGURE 6A, a blank 56 of sheet metal has been stamped out from a larger sheet. This sheet 56 is to be rolled into a generally conical shape, and consequently its sides 58 and 62 are at an acute angle with respect to each other, and its sides 60 and 64 are curved slightly as shown. FIGURE 6B shows the metal sheet 56 after its side 62 has been rolled, and FIGURE 6C shows the sheet 56 after it has been rolled into a conical tube 66. Next, the seam where sides 58 and 62 abut each other or lap over one another is welded as for example with an oxyacetylene torch as illustrated in FIGURE 6D or by any other fusion or bonding method. It is to be understood that the tube could be formed without a seam as by a swedging operation. After the tube 66 has been formed, creases are formed in the tube to define the semitubular lobes. FIGURE 6E shows the tube 66 after two such lobes 68 and 70 have been formed in it by creasing the tube along lines 72 and 74. The lobes 68 and 70 are then creased again to form the four-lobe tube as shown in FIGURE 6F. The tube 66 at this stage has four lobes 76, 78, 80 and 82 and four creases 72, 74, 84 and 86. As shown in FIGURE 6G, a circular ring 90 having an annular portion 92 may be slipped on to the rounded end 64 of the collector tube 66, the annular portion 92 fitting inside the rounded tube portion 64, and the ring and the tube may be welded together. The ring may have apertures 65 in it to facilitate fastening the tube to the next section of the exhaust system. The ring is one type of holding device, and other types of holding devices may be provided at the end of the collector if desired. Also, a tube may be welded to the rounded end of the collector if desired.

FIGURE 7 illustrates a step of creasing the collector as is done between the stages illustrated by FIGURES 6D and 6E. The tube 66 is mounted on an arbor which has four rods 94, 96, 98 and 100. A blade 102 is forced against the metal tube 66 between rods 94 and 96 and draws the metal downward between the latter rods to form a crease at the tip of blade 102. The blade may similarly be forced against the tube 66 between the other pair of rods so as to form the four creases of a four-lobe collector. More than one blade may be used to form more than one crease at a time.

FIGURE 8 is a fragmentary view showing portions of the four pipes 22, 24, 26 and 28 which are ultimately joined to the collector tube to form a header. There is a central opening between the four pipes, and turbulence may be created at this point unless the opening is blocked properly. In FIGURE 8, the opening is blocked by a pyramidal member 100 which fits inside the collector when the pipes and the collector are joined. The pyramidal member 100 of FIGURE 8 is welded to the pipes and has convexly curved sides so that it conforms to the tubular configuration of the pipes and the semitubular configuration of the lobes of the collector to which the pipes are joined. The pyramidal member assures that gases will flow smoothly into the inlet end of the collector without buildup of back pressure.

Although a four-lobe collector has been shown as the preferred embodiment of the invention, other configurations are possible depending on the number of pipes with which the collector is associated. FIGURE 9 shows a three-lobe collector 102 wherein the three lobes 104, 106 and 108 are defined by three longitudinal creases 110, 112 and 114. Both the lobes and the creases extend nearly the full length of the collector tube and they merge gradually into the rounded portion 114 at the outlet end of the collector. Thus, the principle of the three-lobe collector is the same as that of the four-lobe collector described previously; that is, to provide a smooth transition from plural tubes to a single rounded tube for smooth flow of gases through the collector.

FIGURE 10 shows a two-lobe collector based on the same principle, there being two lobes 116 and 118 with two longitudinal creases 120 and 122. The two-lobe collector 124 is for use in headers where only two header pipes are joined to the collector.

It is to be understood that the collector may have no welds or it may have one or more welds as desired. It may be made of one or more pieces of metal.

FIGURE 11 shows another embodiment of the invention wherein the normal outlet opening 128 of the collector is closed by an end cap 130 which fits onto a stud 132 supported by cross blades 134 which are welded to the inside of the collector 126. The end cap 130 is held in place by a wing nut 136. An outlet for the collector 126 is provided by a branch tube 138 which communicates with the interior of the collector 126 through an opening provided in the side of the collector. The embodiment of FIGURE 11 is useful where the collector is to be joined to a non-standard size pipe such as the pipe 138. Alternatively, the collector may have a flange attached to its side to which a pipe may be bolted.

Thus, the invention provides a collector and header which effectively assures a smooth transition for flow of gases from multiple header pipes to a single common outlet opening. The multiple lobes of the collector merge gradually into a rounded tube portion at the opposite end of the collector tube so that there is no obstruction or opening which might cause turbulence in the flow of gases through the collector. The collector is easy to fabricate and can be manufactured by mass production techniques while still providing a high quality, reliable product.

I claim:

1. A collector for an exhaust system comprising a metal tube having a plurality of creases therein extending lengthwise of said tube from one end thereof over substantially the full length thereof, said creases defining a plurality of outwardly projecting semitubular lobes at said one end of said tube which taper and merge gradually into a single tube portion at the other end of said tube, said semitubular lobes also extending from said one end of said tube over substantially the full length of said tube providing a gradual transition along the length of said tube from plural partial tube portions to a single tube portion.

2. An exhaust header comprising a metal collector tube having a rounded portion at one end thereof and having a plurality of creases therein extending lengthwise of said tube and defining a plurality of outwardly projecting semitubular lobes, said lobes and said creases extending from the other end of said tube over at least half of the length thereof providing a gradual transition along the length of said tube from plural partial tube portions to a single rounded tube portion, and a plurality of header tubes joined at an end thereof to said semitubular lobes respectively, said header tubes being grouped in a cluster at said end thereof and having an opening between the same, and further including a pyramidal-shaped member blocking said opening to prevent reverse flow of exhaust gas through said opening, the base of said blocking member joined to said header tubes and the apex thereof extending into the space within said semitubular lobes of said collector to guide flow of gases from said header tubes into said collector tube.

3. An exhaust header comprising a metal collector tube having a rounded portion at one end thereof and having a plurality of creases therein extending lengthwise of said tube and defining a plurality of outwardly projecting semitubular lobes, said lobes and said creases extending from the other end of said tube over substantially the full length thereof providing a gradual transition along the length of said tube from plural tube portions to a single rounded tube portion, and a plurality of header tubes joined at an end thereof to said semi-tubular lobes respectively, and having an opening between the same, and further including a member blocking said opening to prevent reverse flow of exhaust gas through said opening.

4. The exhaust header of claim 3 in which said blocking member has a pyramidal shape with the base thereof joined to said header tubes and with the apex thereof extending into the space within said semitubular lobes of said collector to guide flow of gases from said header tubes into said collector tube.

References Cited

UNITED STATES PATENTS 2,798,745   7/1957   Nelson _____ 285—155

FOREIGN PATENTS 505,515   12/1954   Italy.
124,115   2/1949   Sweden.

OTHER REFERENCES

Hot Rod Magazine, July 1965, p. 101.
Car Craft, January 1964, Exit Only, Bud Lang, author.
Bud Lang: Car Craft, December 1966, pp. 66–71.
Chev. 180° Hedders, Honest Charlies Speed Shop, p. X (lower right), 1965.
Douglass Muffler Mfg. Co., catalogue publication, 1965.
Hot Rod, Ideas That Work, November 1965, p. 11.

ROBERT G. NILSON, Primary Examiner

U.S. Cl. X.R.

29—157; 60—29; 181—40